Aug. 28, 1923.

J. B. HARLOW

DETECTING SYSTEM

Filed June 24, 1919

1,466,284

Inventor:
John B. Harlow
by J. E. Roberts Att'y.

Patented Aug. 28, 1923.

1,466,284

UNITED STATES PATENT OFFICE.

JOHN B. HARLOW, OF UPPER MONTCLAIR, NEW JERSEY, ASSIGNOR TO WESTERN ELECTRIC COMPANY, INCORPORATED, OF NEW YORK, N. Y., A CORPORATION OF NEW YORK.

DETECTING SYSTEM.

Application filed June 24, 1919. Serial No. 306,405.

*To all whom it may concern:*

Be it known that I, JOHN B. HARLOW, a citizen of the United States, residing at Upper Montclair, in the county of Essex, State of New Jersey, have invented certain new and useful Improvements in Detecting Systems, of which the following is a full, clear, concise, and exact description.

This invention relates to detecting systems, especially those used in detecting the presence of marine or submarine vessels.

In such systems, especially those in which certain areas are equipped with a plurality of submerged vibration detectors adapted to respond to mechanical vibrations propagated through the water from a submarine or other marine vessel, it is desirable to provide means whereby the areas may be quickly and easily observed from some predetermined point, each detector being subjected to individual and identified observation.

It is one object of this invention to provide a system of this nature wherein the various detectors may be observed individually or in groups for locating the source of the received vibrations. A further object of the invention resides in a method of readily and accurately operating a system of this nature.

To attain these objects in accordance with one feature of the invention, a plurality of detectors which are normally in operative association with an observing station may be disassociated therefrom and individually reassociated therewith.

In accordance with a second feature of the invention, observer controlled means is provided whereby a detecting station may be identified upon its reassociation with the observing means. More specifically, each detecting station is provided with means whereby the vibration detector thereat may be selectively associated with the transmission line connected to a receiving means at the observer's station, additional means being provided operable upon the continuance of such connection for a predetermined time to transmit an identifying signal to the observer.

In accordance with a further feature of the invention, a method of operating a system of this kind is employed whereby the observed area is definitely allocated to enable the observer to quickly and positively determine that the vibrations under observation emanate from a certain definitely outlined section of the area. To accomplish this result, several substantially parallel lines of detecting stations are provided, the spacing of the lines as well as of the individual stations thereon being dependent upon the effective ranges of the detectors.

Figure 1:
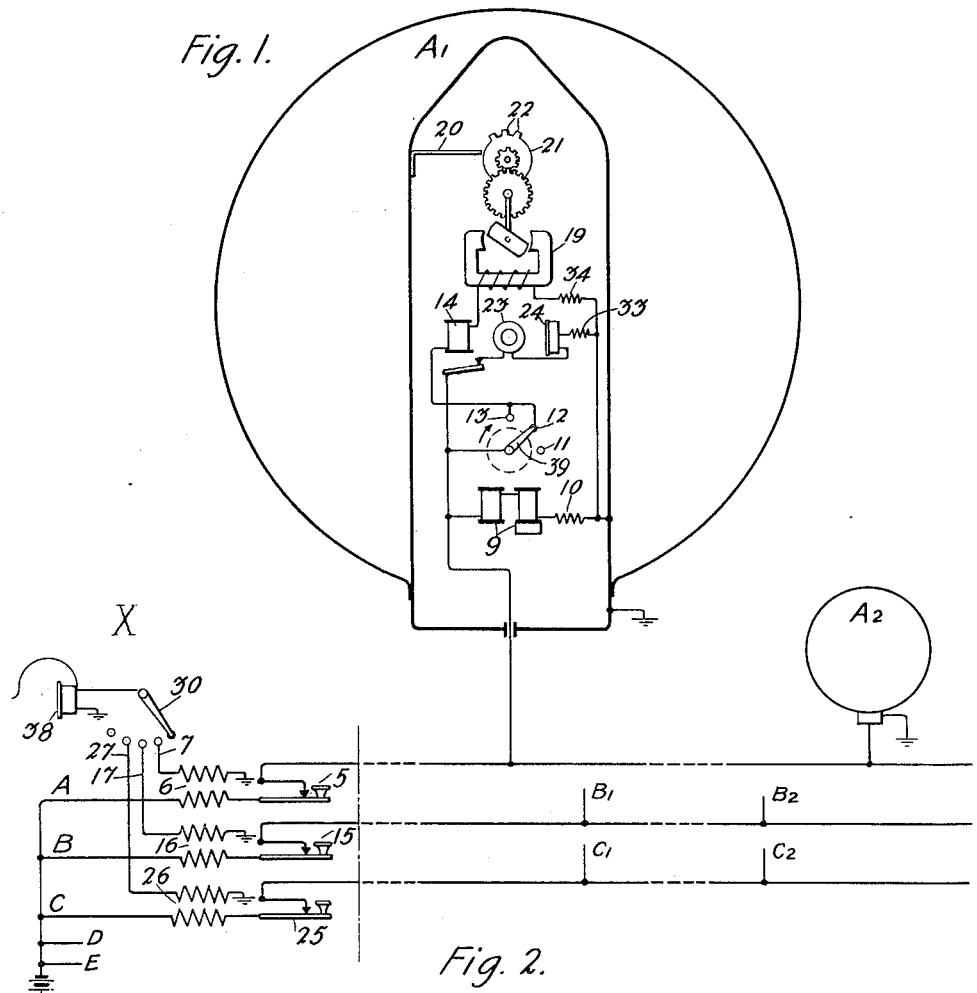
Figure 2:
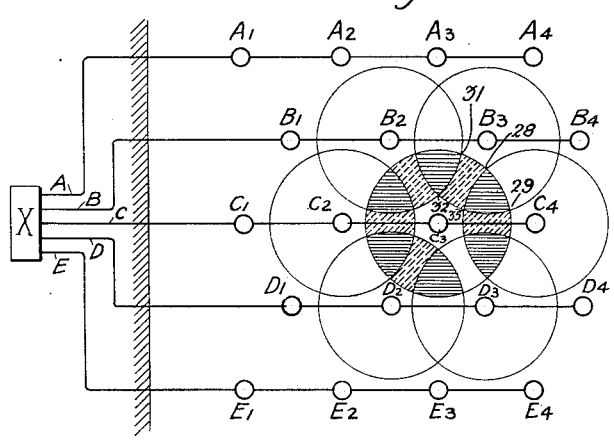

These and other features of the invention will clearly appear from the following specification and the annexed drawing, Fig. 1 of which shows one embodiment of the invention as applied to a submarine detection system, and Fig. 2 shows diagrammatically the distribution and relative arrangement of the various detectors of such a system in the area to be allocated.

Referring to the drawing, each of a plurality of transmission lines A, B, C, D and E extends from an observing station which may be located at some convenient point on the shore to a plurality of spaced detecting stations $A^1$, $A^2$, $A^3$, $A^4$, etc. each occupying a substantially fixed position in relation to the others and preferably being located in a submerged buoy or buoyant mine casing as indicated in Fig. 1. The lines are provided with normally closed circuit controlling keys 5, 15 and 25 at station X for controlling the application of current thereto. Induction coils 6, 16 and 26 are also provided for cooperation with switch 30 in associating the observer's receiver 38 with the respective lines. Each detecting station is equipped as illustrated in Fig. 1 for station $A^1$, on line A, with a step-by-step selector 9 with which cooperates a relay 14 to control the connection of the associated pair of serially connected detectors 23 and 24 thereat with the line. The selector 9 may be of any type capable of step-by-step advancement in response to closely succeeding unidirectional impulses of current received over the line circuit and having a contact arm 39 normally occupying a disengaged position, as shown at 11, and being adjustable to selectively and individually close its contact 13 in response to a predetermined series of unidirectional current impulses and to close its contact 12 simultaneously with the other selectors in response to another series of such impulses. Selective calling apparatus of the general type disclosed in Patent No. 1,140,120 granted to E. B. Craft and G. Brown, May 15, 1915 may be advantageously used for this purpose. The detectors 23 and 24 may be of any suitable type responsive to mechanical vibrations propagated through the water from the submarine or other source and adapted to cause corresponding variations in the electrical conditions of a circuit when associated therewith. Such detectors are preferably placed with their diaphragms or other vibration responsive members in planes disposed at right-angles to each other in order to render them non-directional in their response to the received vibrations. A slow operating electromagnetic device 19 in series with relay 14 is adapted, when operated, to cause the counterclockwise rotation of an impulse wheel 21, projections 22 thereon engaging the resilient metallic arm 20 attached to the inner shell of the enclosing casing to produce a characteristic answer-back signal through the associated detectors to the observing station.

In Fig. 2, the substantially parallel transmission lines A, B, C, D and E are shown spaced at intervals somewhat less than the effective detecting range of the individual station detectors, which range is diagrammatically represented by the radius of the circle surrounding each station.

It is thought that the invention may be more fully comprehended from the following description of the operation of the system illustrated on the drawing. Referring particularly to line A in Fig. 1, with the key 5 in its normally closed position as shown, and the selectors at all stations of the associated line normally operated to cause the contact arm 39 to engage contact 12, the circuit for maintaining the selectors in operated condition may be traced from battery, through the primary winding of induction coil 6, contact of key 5, over the line conductor and at each station through the winding of selector 9 and the resistance 10 to ground. The buoy casing is grounded through the sea water in which it is submerged and also by means of the armor of the cable. Relay 14 and signaling device 19 at each station are also maintained in operated condition due to current supplied to the line conductor as previously described and flowing through the contact arm 39 and contact 12 of selector 9, windings of relay 14 and signaling device 19 in series and resistance 34 to ground. The closure of the contact of relay 14 places the serially connected current varying devices of detectors 23 and 24 and resistance 33 in a circuit in parallel with that including the winding of selector 9 and the resistance 10. The other circuit controlling keys 15, 25 etc. being normally closed, the observer moves switch 30 to engage switch-point 7, thereby placing the receiver 38 in circuit with the secondary of induction coil 6 enabling the observer at station X to listen-in on the line A. In case sounds are received which warrant further investigation, the observer actuates key 5, to remove battery supply from the line circuit A for a sufficient time to release all selectors on the line restoring the arms thereof to position 11 and render all associated detectors non-effective. The observer then proceeds to selectively and individually reconnect the detectors at the various stations to the line by successively actuating and releasing the key 5 to transmit closely succeeding unidirectional current impulses over the line and through the selector windings at each station associated therewith. All such selectors are advanced in response to the impulses received and each selector is individually adjusted to close its contact 13 upon the receipt of a predetermined number of closely succeeding impulses. For instance, the selector 9 at station $A^1$ may close its contact 13 upon the receipt of the third impulse, while in response to the fourth impulse such contact may be opened and the corresponding contact 13 of the corresponding selector at station $A^2$ may be closed. In each case the key 5 may be retained in a closed position for a period of sufficient duration to permit the observer to detect any sounds produced by the receiver due to the vibrations affecting the selected station detectors. Upon the receipt of the sounds originally noted by the observer with the detectors at all stations in operation, the key 5 is retained closed for a somewhat longer interval, thereby permitting the actuation of the slow operating device 19 to cause the rotation of impulse wheel 21, the projections 22 thereof engaging the resilient reed member 20 attached to the enclosing casing. When each projection 22 is disengaged from the member 20, the vibration of such member produces a characteristic sound, the vibrations of the associated detectors 23 and 24 in response thereto causing a corresponding set of current variations in the line circuit A. The current variations flowing through the primary winding of induction coil 6 induce currents in the secondary winding of such coil which are retranslated into audible effects by the receiver 38 in circuit with the secondary winding. The number and arrangement of the projections 22 differ for each station on a line so that an individual series of the characteristic sounds will be transmitted in each instance, thereby enabling the observer to positively identify the station under observation. Upon the completion of the observation of the various stations on line A, the observer retains key 5 in an open position for a sufficient time to release all selectors and thereafter transmits the predetermined number of current impulses to cause all selectors 9 on the line A to associate the detectors 23 and 24 at each station with the line, by the engagement of arm 39 with contact 12, thereby restoring the line A to its normal condition. The switch arm 30 is then moved into engagement with switchpoint 17, thereby associating the receiver 38 with the line B, through the induction coil 16 and the stations on such line may be subjected to observation in the same manner as described for line A. Similarly, the other lines, C, D and E of the system may be observed. In order to insure the proper operation of the selectors 9, the detectors 23 and 24 and the answer-back device 19, and relay 14, the values of associated resistances 10, 33 and 34 may be varied to provide substantially the same amount of current at each station along the line.

Referring particularly to Fig. 2, the protected area may be definitely allocated to establish the location of any detected source of vibration. Since all of the detecting stations have substantially the same effective range as regards the vibrations to be detected, such range exceeding the spacing of the adjacent lines along which the individual stations are off-set with a similar spacing, the total area may be considered as subdivided into territories bounded by the circumferences of the overlapping circles defining the effective ranges of the various stations. Therefore, if upon observation, it is found that the vibrations are received with substantially equal strength through the detectors at station $B^3$ of line B and stations $C^3$ and $C^4$ of line C, it may be considered that the source of such vibrations is located within the territory included by the arcs of the circles interconnecting intersection points 28, 29 and 35. However, if the vibrations are received with substantially equal strength through stations $B^3$ of line B, and $C^3$ of line C, it is evident that the source is located in a territory enclosed by the arcs of the circles interconnecting the intersection points 28, 35, 32 and 31. If the vibrations are received only through station $C^3$ on line C, the source is identified as being located within the portion of the range circle of such station which is not included in the overlapping portions of range circles of adjacent stations.

It is evident that by the observation of the varying effects of a certain set of vibrations upon the detecting stations of the system, it is possible to definitely determine the presence of the source within a certain localized area, the boundaries of which are definitely established.

What I claim is:

1. In a detection system, a transmission line, a plurality of detectors normally operatively associated therewith, a source of current connected to the line, a receiving device associated with the line at an observing station and normally responding to any detector, means for disassociating the detectors from the line and for successively reassociating the detectors with the line, and means controlled thereby to indicate to the observer the last reassociated detector.

2. In a detection signaling system, a transmission line, a source of current associated therewith, receiving means associated with the line at an observer's station, a detector, means for associating said detector with the line, and means responsive to such association for producing a distinctive signal, said signal being transmitted by the detector over the line to the receiving device.

3. In a detection system, a transmission line, a source of current associated therewith, a plurality of detecting devices normally operatively associated with a line, receiving means normally associated with the line at an observer's station and operated by any of the detecting devices, means for disconnecting all of the detectors in response to the disconnection of the source of current from the line and responsive to successive reapplications of current to the line for successively reconnecting the devices to the line for observation, and identifying answer-back means at each detector operable upon the continuance of the application of current to indicate to the observer the station last connected to the line.

4. In a detection system, a transmission line, a plurality of detectors normally operatively associated therewith, a source of current connected to the line, a receiving device normally operatively associated with the line, means for disconnecting the detectors from the line and operative for successively reconnecting the detectors to the line for observation, a slow operating relay for each detector controlled by the reconnection of the assciated detector, and an answer-back signaling means controlled thereby.

5. In a detecting signaling system, a transmission line, a source of current associated therewith, receiving means associated with the line at an observer's station, a detector, means for associating said detector with the line, and means responsive to such association for producing a distinctive audible signal in the proximity of said detector, said signal being transmitted by the detector over the line to the receiving means.

6. In a detection system, a transmission line, a source of current associated therewith, a plurality of detecting devices normally operatively associated with the line, receiving means normally associated with the line at an observer's station and operated by any of the detecting devices, means for disconnecting all of the detectors in response to the disconnection of the source of current from the line and responsive to successive re-applications of current to the line for successively reconnecting the devices to the line for observation.

7. In a system for localizing a source of vibration within a prescribed area, a plurality of transmission lines each connecting a plurality of detectors to an observing point, means to selectively render any detector on any line operative, and means controlled by such selective operation to cause the selected detector to transmit a distinctive answer-back signal to the observing point.

8. In a detection system, a transmission line, an observing station and a plurality of vibration detectors each located within a casing, said detectors connected to the line, receiving means at the observing station connected to the line, means for selectively connecting the detectors with the line, means controlled by said selective means and associated with said casing to produce a signal, said signal being transmitted to the observing station through the selected vibration detector.

In witness whereof, I hereunto subscribe my name this 17th day of June A. D., 1919.

JOHN B. HARLOW.